(12) United States Patent
Landmann (10) Patent No.: US 8,511,609 B2
(45) Date of Patent: Aug. 20, 2013

(54) STRUCTURAL MODE SHAPE ALIGNMENT

(75) Inventor: Alan E Landmann, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 1157 days.

(21) Appl. No.: 10/846,861

(22) Filed: May 14, 2004

(65) Prior Publication Data

US 2005/0253016 A1 Nov. 17, 2005

(51) Int. Cl.
*B64C 1/06* (2006.01)

(52) U.S. Cl.
USPC .................................................. 244/119

(58) Field of Classification Search
USPC ................................................ 244/119, 120
See application file for complete search history.

(56) References Cited

U.S. PATENT DOCUMENTS

| | | | | |
|---|---|---|---|---|
| 1,321,115 | A * | 11/1919 | Longren et al. | 244/119 |
| 1,818,423 | A * | 8/1931 | Mummert | 244/119 |
| 1,894,011 | A * | 1/1933 | Wallis | 244/119 |
| 2,060,387 | A * | 11/1936 | Wallis | 244/119 |
| 2,314,949 | A * | 3/1943 | Palmer | 244/119 |
| 2,352,296 | A * | 6/1944 | Szego | 114/83 |
| 4,086,378 | A * | 4/1978 | Kam et al. | 428/34.5 |
| 4,230,293 | A * | 10/1980 | Hamm et al. | 244/119 |
| 4,566,231 | A | 1/1986 | Konsevich | |
| 4,896,846 | A * | 1/1990 | Strom | 244/75.1 |
| 5,322,242 | A * | 6/1994 | Tracy | 244/36 |
| 5,855,340 | A * | 1/1999 | Bacon | 244/53 R |
| H1864 | H | 10/2000 | Demoret | |

OTHER PUBLICATIONS

B.M. Efimtsov, "Characteristics of the field of turbulent wall pressure fluctuations at large Reynolds numbers", Sov. Phys. Acoust., Jul.-Aug. 1982. pp. 289-292.
B.M. Efimtsov, "Aircraft Fuselage Skin Vibration in the Field of Pressure Fluctuations", Central Aerohydrodynamic Institute, undated, pp. 756-762.
Alan Powell, "On the Fatigue Failure of Structures due to Vibrations Exited by Random Pressure Fields", The Journal of the Acoustical Society of America, Dec. 1958, pp. 1130-1135.
"The Prediction of the Pressure Fluctuation Field Characteristics of the Turbulent Boundary Layer" Final Report, 1995, pp. 1-106.
"Wall Pressure Fluctuations of Gradient Boundary Layer on a Smooth Surface" Report, 1999, pp. 1-65. W.V. Bhat, "Flight Test Measurement of Exterior Turbulent Boundary Layer Pressure Fluctuations on Boeing Model 737 Airplane", J. Sound Vib., 1971, pp. 439-457.
"Publication illustrating fuselage of Wellington Bomber aircraft incorporating Isogrid structure", as least as early as Mar. 11, 2004.

* cited by examiner

*Primary Examiner* — Tien Dinh
(74) *Attorney, Agent, or Firm* — Harness, Dickey & Pierce, P.L.C.

(57) ABSTRACT

Apparatus and method for controlling the orientation of a fundamental panel vibration mode shape of a structure, such as a skin panel of a fuselage of an aircraft, relative to the direction of a turbulent boundary layer flow over the fuselage, and in a manner to achieve a level of noise reduction within the fuselage. The fuselage is constructed either through orientating stringers and/or frame members, or by using stiffening members placed diagonally between the stringers and frame members, in a manner that produces a fundamental panel vibration mode shape that extends at an angle of between about 30°-45° relative to the direction of the turbulent boundary layer flow over the fuselage. Aligning the fundamental panel vibration mode shape at an angle of between about 30°-45° relative to the direction of the turbulent boundary layer flow results in a reduction of the vibration response of the skin panel, and thus a reduction in the noise level within the fuselage.

5 Claims, 7 Drawing Sheets

*Prior Art*

STRUCTURAL MODE SHAPE ALIGNMENT

FIELD OF THE INVENTION

The present invention relates to systems and methods for ameliorating noise, and more particularly, to a system and method for ameliorating noise within a high speed mobile platform, in which the noise is caused in large part by the turbulent boundary layer air flow over a skin panel structure of the mobile platform.

BACKGROUND OF THE INVENTION

With various forms of commercial platforms in which passengers are transported, minimizing noise inside a cabin of the mobile platform is an important consideration. In applications involving commercial passenger aircraft, this is an especially important consideration. The cabin noise within a commercial aircraft is caused at least in part by the turbulent boundary layer flow over the skin of the aircraft. This is especially so when the aircraft is traveling at cruise speeds (e.g., around 500 mph or slightly greater), and at an area within the fuselage generally between the nose and wings.

It would be highly advantageous and desirable if an additional degree of noise reduction could be accomplished without simply adding additional insulation into the construction of a fuselage or other cabin-like structure of a high speed mobile platform. As will be appreciated, the adding of insulation increases the weight of the mobile platform, as well as its cost of manufacture. The additional weight added to the mobile platform by simply adding extra insulating material into the fuselage also increases the overall weight of the mobile platform, and therefore contributes to a reduction in fuel economy.

SUMMARY OF THE INVENTION

The present invention is directed to a method and apparatus for forming a structure, for example a fuselage or other frame-like component of a mobile platform, in a manner that results in the fundamental panel mode of the wall of the fuselage or cabin-like structure being non-parallel to the direction of a turbulent boundary layer flow over an outer surface of the fuselage or cabin-like structure when the mobile platform is traveling at high speeds.

In one preferred form, the fuselage or cabin-like structure is formed such that the fundamental panel vibration mode is arranged at an angle of preferably between about 5°-45°, and more preferably between about 30°-45°, relative to the direction of flow of the turbulent boundary layer over the outer surface of the fuselage or cabin-like structure. When the fundamental panel vibration mode assumes an angle of between about 5°-45° relative to the direction of the turbulent boundary layer flow, a reduction of at least approximately 2-3 dB in noise level is achieved over that which would be present if the direction of the turbulent boundary layer flow was parallel to the direction in which the fundamental panel mode extends. This reduction in noise is due in large part to the rapid decay of the turbulent boundary layer fluctuating pressure correlation characteristics over the outer surface of the fuselage or cabin-like structure in the span-wise direction (i.e., generally perpendicular to the longitudinal axis extending along the fuselage or cabin-like structure).

In one particular implementation, an aircraft fuselage is formed with a plurality of interlinked stringers and frames. However, the stringers are not arranged perpendicular to a longitudinal axis of the fuselage, but rather arranged to extend at an angle non-parallel to the longitudinal axis of the fuselage. In one specific implementation, the stringers are formed at an angle between approximately 5°-45° relative to the longitudinal axis of the fuselage.

In another implementation, diagonal stiffening members are coupled diagonally between the parallel stringers, where the stringers extend parallel to the longitudinal axis of the fuselage or cabin-like structure. The stiffeners can be constructed of a material and weight that is only required to add a predetermined degree of additional stiffness to a skin panel of the fuselage. In this manner, the stiffeners can modify the fundamental panel vibration mode shape such that it extends non-parallel to the flow direction of the turbulent boundary layer.

By orientating the stringers and frame members of the fuselage such that a fundamental skin panel vibration mode shape is produced that is non-parallel to the direction of the boundary layer flow, a reduction in noise within the cabin of the mobile platform, caused by the turbulent boundary layer flow, can be achieved.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 8 is a graph of the lateral component of the joint acceptance as a function of mobile frequency.

DETAILED DESCRIPTION OF THE PREFERRED EMBODIMENTS

The following description of the preferred embodiment(s) is merely exemplary in nature and is in no way intended to limit the invention, its application, or uses.

Figure 1:
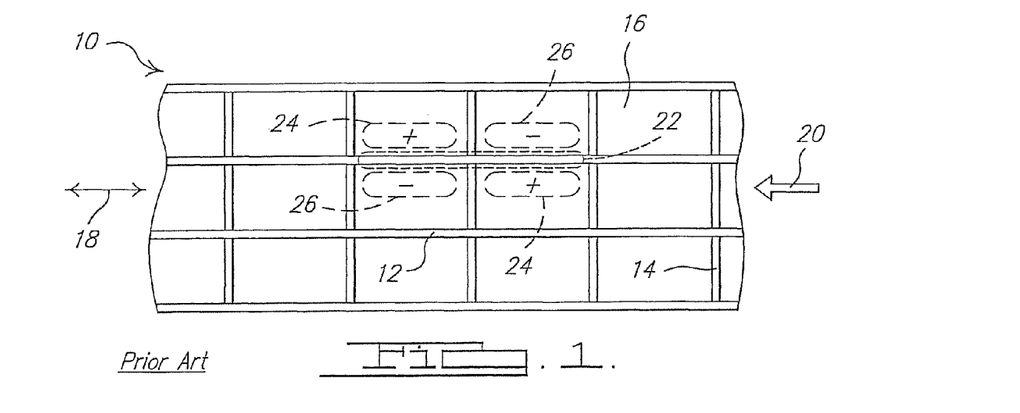
FIG. 1 is a simplified representation of a portion of a prior art fuselage of a mobile platform illustrating the fundamental panel vibration mode shape produced by the arrangement of the stringers and frame members, and where the fundamental panel vibration mode shape is directed generally parallel to the direction of the turbulent boundary layer flow.

Referring to FIG. 1, there is shown a prior art illustration of a representative portion of a fuselage 10 of a mobile platform, in this example a commercial jet aircraft, in accordance with a prior art construction of the fuselage. The fuselage 10 incorporates a plurality of stringers 12 and frame members 14 that support a skin panel 16. The stringers 12 are oriented generally parallel to a longitudinal axis 18 of the fuselage 10. It has been determined through testing and analysis that this arrangement of frames and stringers produces a fundamental panel vibration mode shape for the skin panel 16 that is aligned generally parallel to a major streamline of the direction of the turbulent boundary layer. This is indicated in simplified fashion by dashed line 22, and the major streamline of the turbulent boundary layer flow is represented by arrow 20. It will be appreciated that the fundamental vibration mode shape is a natural response of the skin panel 16 that is independent of the type of excitation acting on the skin panel 16. In this example, portions 24 represent areas of displacement of the skin panel 16 that would be projecting slightly toward the reader (i.e., out of the paper), while areas 26 represent portions of the skin panel 16 that would be displaced away from the reader (into the paper). The result is a fundamental panel vibration mode shape that is oriented parallel to the longitudinal axis 18 of the fuselage 10, and parallel to the direction of the major streamline of the turbulent boundary layer flow 20 over the fuselage 10.

Figure 2:
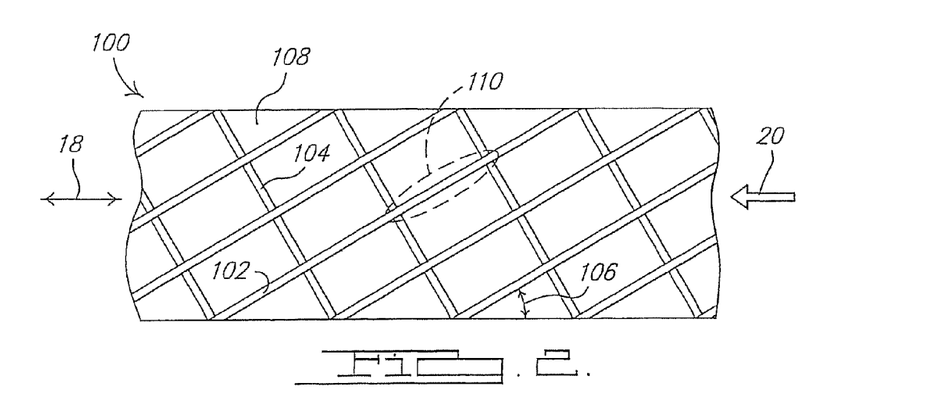
FIG. 2 is an illustration of a representative portion of the fuselage of an aircraft in which the stringers and frame members are coupled perpendicular to one another, but where the stringers are arranged non-parallel relative to a direction of a turbulent boundary layer flow, and thus produce a fundamental panel vibration mode shape that is at an angle non-parallel to the direction of the turbulent boundary layer flow.

Referring now to FIG. 2, a preferred embodiment of a fuselage 100 is shown that is constructed in accordance with the principles of the present invention. Fuselage 100 includes a plurality of stringers 102 interconnected with a plurality of frame members 104. Stringers 102 and frame members 104 are coupled generally perpendicular to one another. Stringers 102 can compromise I-beam stringers, blade type stringers, or any other suitable form of stringer. However, the stringers 102, instead of being oriented generally parallel to the longitudinal axis 18 of the fuselage 100, are instead skewed so as to be oriented at an angle represented by arrow 106. Skin panel 108 is secured to the stringers 102 and frame members 104 in any suitable fashion.

The orientation of the stringers 102 at an angle 106 relative to the direction of flow of the major streamline of the turbulent boundary layer 20 has been found to provide a fundamental panel vibration mode shape that is oriented non-parallel to the major streamline of the turbulent boundary layer flow 20. The fundamental panel vibration mode shape of the fuselage 100 is represented in simplified form by dashed line 110. For maximum noise level reduction, the orientation of the fundamental panel vibration mode shape 110 is preferably between about 30°-45°, relative to the direction of the major streamline of the turbulent boundary layer flow 20. However, even some degree of noise reduction is achieved with the fundamental panel mode shape oriented at only 5° relative to the major streamline of the turbulent boundary layer flow 20.

With the fundamental panel vibration mode shape oriented between approximately 30°-45° relative to the direction of the major streamline of the turbulent boundary layer flow 20, a noise reduction inside the fuselage 100 of at least about 2-3 dB can be realized for structural skin panels with fundamental panel vibration mode natural frequencies less than 500 Hz. This is due to the reduction in vibration of the skin panel 108 over what would be experienced when the fundamental panel vibration mode shape is aligned parallel to the major streamline of the turbulent boundary layer flow 20. More specifically, this reduction in vibration experienced by the skin panel 108 is largely associated with the rapid decay of the turbulent boundary layer fluctuating pressure correlation characteristics in the span-wise direction.

Figure 3:
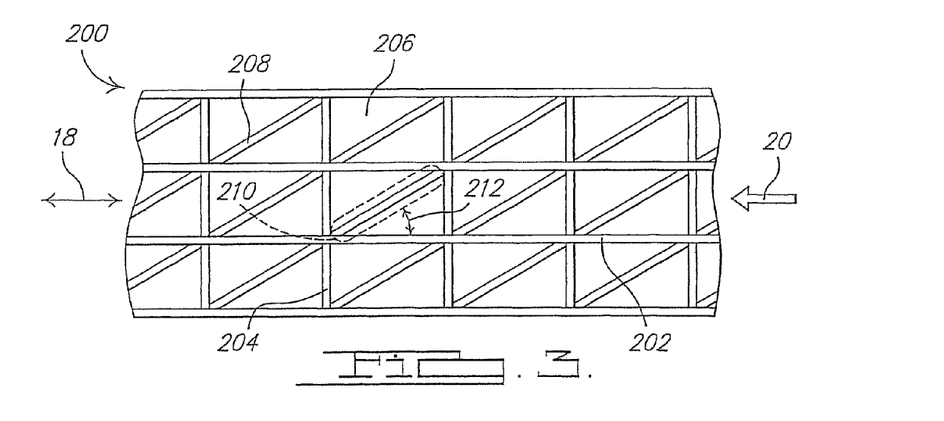
FIG. 3 is an alternative preferred form of the fuselage in which diagonal stiffening members are incorporated to provide a fundamental panel vibration mode shape which is aligned non-parallel to the direction of the turbulent boundary layer flow.

Referring to FIG. 3, an alternative embodiment 200 of the fuselage is illustrated. The fuselage 200 similarly includes stringers 202 and frame members 404 interconnected perpendicular to one another to form a grid-like supporting structure for an outer skin panel 206. However, diagonally placed stiffening members 208 are coupled in between the stringers 202 and the frame members 204. Stiffening members 208 may comprise conventional I-beam type members, conventional blade type members or any other form of stiffening component, and are secured to the skin panel 206, and serve to further stiffen the skin panel 206. When the stiffening members 208 are oriented at an angle that is non-parallel to the direction of the major streamline of the boundary layer flow 20, a fundamental panel vibration mode shape 210 is achieved which is also non-parallel to the direction of the major streamline of the turbulent boundary layer flow 20. The angle of the fundamental panel vibration mode shape 10 is preferably between about 30°-45° from the major streamline of the turbulent boundary layer flow 20, and even more preferably about 30°, relative to the direction of the flow 20. Again, orientating the fundamental panel vibration mode shape 210 at an angle of preferably about 30°-45° can result in a noise and vibration level reduction within the fuselage 200 of at least about 1-5 dB. Even small angles such as 5° will provide some level of noise and vibration reduction, although the largest reductions are generally achieved at angles of about 30°-45°. Angles greater than about 30°-45° will provide some degree of noise attenuation but to a lesser extent than angles between about 30°-45°.

The following analysis is intended to illustrate the effects of the angle of the major streamline of the turbulent boundary layer flow relative to the fundamental panel vibration mode shape of the skin panel 108 or 206. In the analysis, the major streamline of the turbulent boundary layer flow 20 was oriented at an angle to a simply supported panel. The term "simply supported" refers to the boundary condition at the edge of the panel. For a simply supported panel, the edges are fixed in translation but allowed to rotate.

The velocity spectral density $\Phi_{vv}(\omega)$, or vibration response, of a panel subjected to a random pressure field may be written as:

$$\Phi_{vv}(\omega) = \sum_{l}^{N} |Y_r|^2 \Phi_{pp}(\omega) A^2 j_{rr}^2(\omega)$$

where $|Y(\omega)|^2$ is the admittance matrix, $\Phi_{pp}(\omega)$ is the spectral density of the fluctuating pressure, A is the surface area of the plate and $j_{rr}^2(\omega)$ is a non-dimensional value called the joint acceptance. The joint acceptance is a measure of the effectiveness of the complex pressure field in exciting a particular vibration mode of a structure. For any particular mode the joint acceptance is a real value that varies between zero and one. The vibration response of a panel either increases or decreases as the joint acceptance of the structural mode increases or decreases. A value of zero indicates that a structural mode is not excited by the fluctuating pressure field and a value of one indicates that there is a perfect match between the fluctuating pressure field and the structural mode. In other words, the lower the value of the joint acceptance, the lower the vibration response of the panel will be. The joint acceptance may be defined by:

$$j_{rr}^2(\omega) = \int_A \int_A C_{pp}(\omega) \phi_r(z) \phi_r(z') \, dz \, dz' / A^2$$

where $\phi_r$ is the mode shape for a particular mode r and $C_{pp}(\omega)$ is the narrow band space correlation coefficient of the fluctuating pressure field.

The narrow-band space correlation coefficient $C_{pp}$ of the turbulent boundary layer fluctuating pressure field is defined:

$$C_{pp}(\omega) = \frac{\Phi_{pp}(\xi_1, \xi_2, \omega)}{\Phi_{pp}(\omega)} = \exp\left[-\frac{|\xi_1|}{\Lambda_1(\omega)} - \frac{|\xi_2|}{\Lambda_2(\omega)} - \frac{i\omega\xi_1}{U_{ph}(\omega)}\right]$$

where $|\xi_1|$ and $|\xi_2|$ are the components of space separation vectors between points (1) and (2) along the stream-wise axis direction x, $|\xi_1|=|x_2-x_1|$ and span-wise axis direction y, $|\xi_2|=|y_2-y_1|$;

$\Lambda_1(\omega)$ and $\Lambda_2(\omega)$ are the correlation scales in vector directions $\xi_1$ and $\xi_2$; and $U_{ph}(\omega)$ is the phase velocity in vector direction $\xi_1$.

The level $\Phi_{pp}(\omega)$, the spatial correlation constants $\Lambda_1(\omega)$ and $\Lambda_2(\omega)$, and the convection velocity $U_{ph}(\omega)$ are functions of the Strouhal number $\omega\delta/U_\tau$ where $\delta$ is the boundary layer thickness and $U_\tau$ is the dynamic velocity.

In general, the spanwise correlation scale $\Lambda_2$ is much smaller than the streamwise correlation scale $\Lambda_1$. As a result, the spanwise components of the boundary layer flow are much less efficient than the streamwise components in exciting a structural panel.

Mode shapes $\phi$ of a simply supported flat plate with length L and width W are given by:

$$\phi_{mn} = \sin\frac{m\pi x}{L} \sin\frac{n\pi y}{W}.$$

where the mode indices m and n represent the number of half-waves in the x and y directions, respectively.

In developing the joint acceptance functions for the simply supported plate it is reasonable to assume:

$$j_{mn}^2 = j_m^2 \cdot j_n^2$$

where $j_m^2$ and $j_n^2$ are the joint acceptance functions for the mode indices m and n, respectively. These terms are easily calculated when the coordinate system of the simply supported plate is aligned with the coordinate system for the turbulent boundary layer correlation coefficients.

Figure 4:
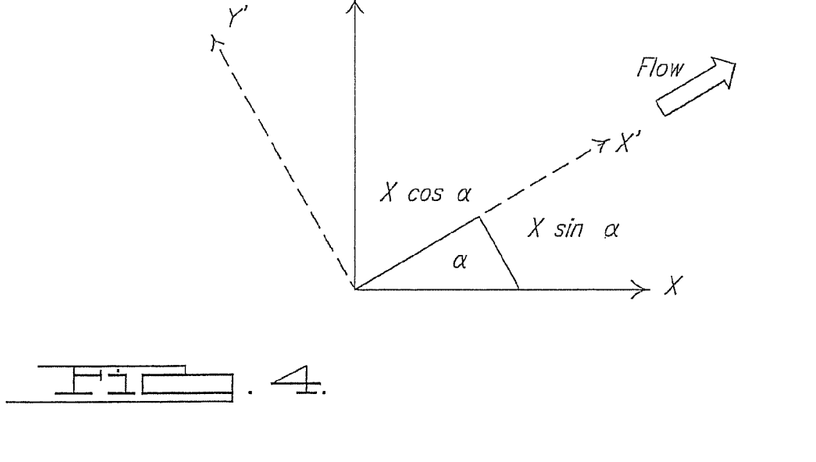
FIG. 4 is a diagram for assisting in the description of the turbulent boundary layer coordinate transformation.

Referring to FIG. 4, when the coordinate system X'Y' of the turbulent boundary layer flow is rotated relative to the coordinate system XY of the simply supported plate a coordinate transformation is first performed. The correlation parameters $\Lambda_1$, $\Lambda_2$ and $U_{ph}$ in the X'Y' system are related to a rotated system XY as shown below:

$$U_{phX} = U_{ph} / \cos\alpha$$

$$U_{phY} = U_{ph} / \sin\alpha$$

-continued $$\frac{1}{\Lambda_x} = \frac{\cos\alpha}{\Lambda_1} + \frac{\sin\alpha}{\Lambda_2}$$

$$\frac{1}{\Lambda_y} = \frac{\cos\alpha}{\Lambda_2} + \frac{\sin\alpha}{\Lambda_1}$$

The narrow-band space correlation coefficient $C_{pp}(\omega)$ of the turbulent boundary layer fluctuating pressure field is now defined:

$$C_{pp}(\omega) = \exp\left[\begin{array}{c}-|X|\left(\frac{\cos\alpha}{\Lambda_1(\omega)} + \frac{\sin\alpha}{\Lambda_2(\omega)}\right) - |Y|\left(\frac{\cos\alpha}{\Lambda_2(\omega)} + \frac{\sin\alpha}{\Lambda_1(\omega)}\right) - \\ \frac{i\omega X \cos\alpha}{U_{ph}(\omega)} - \frac{i\omega Y \sin\alpha}{U_{ph}(\omega)}\end{array}\right]$$

In this equation $|X|$ and $|Y|$ are the components of space separation vectors between points (1) and (2) along the axis direction x, $|X|=x_2-x_1$ and axis direction y, $|Y|=|y_2-y_1|$ of the simply supported panel coordinate system. The equation represents the boundary layer pressure fluctuations on the outside of the aircraft.

Figure 5:
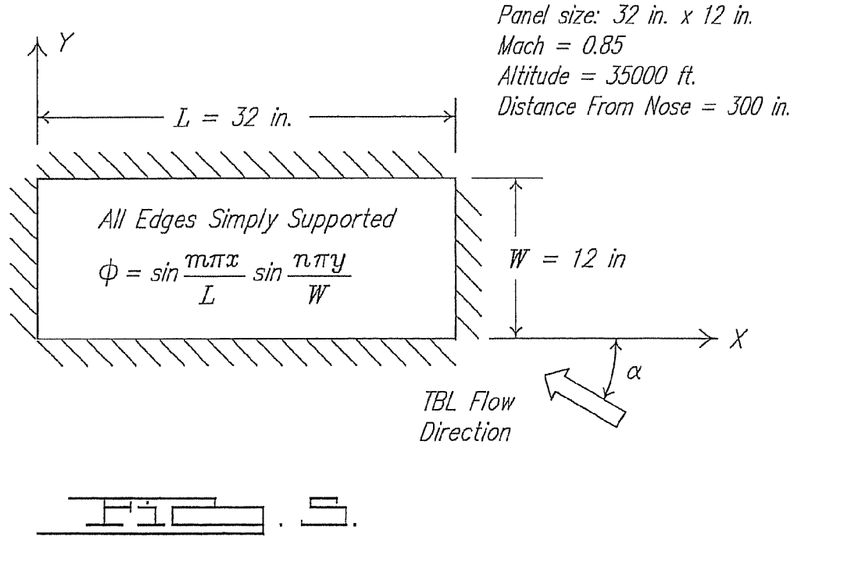
FIG. 5 is a diagram for assisting in the description of the joint acceptance function for the fundamental panel vibration mode shape.

Referring to FIG. 5, the joint acceptance function for the fundamental panel mode (m=1,n=1) of a simply supported plate was calculated at angles $\alpha=0°, 5°, 10°, 15°, 30°$ and $45°$ for the case described below.

Figure 6:
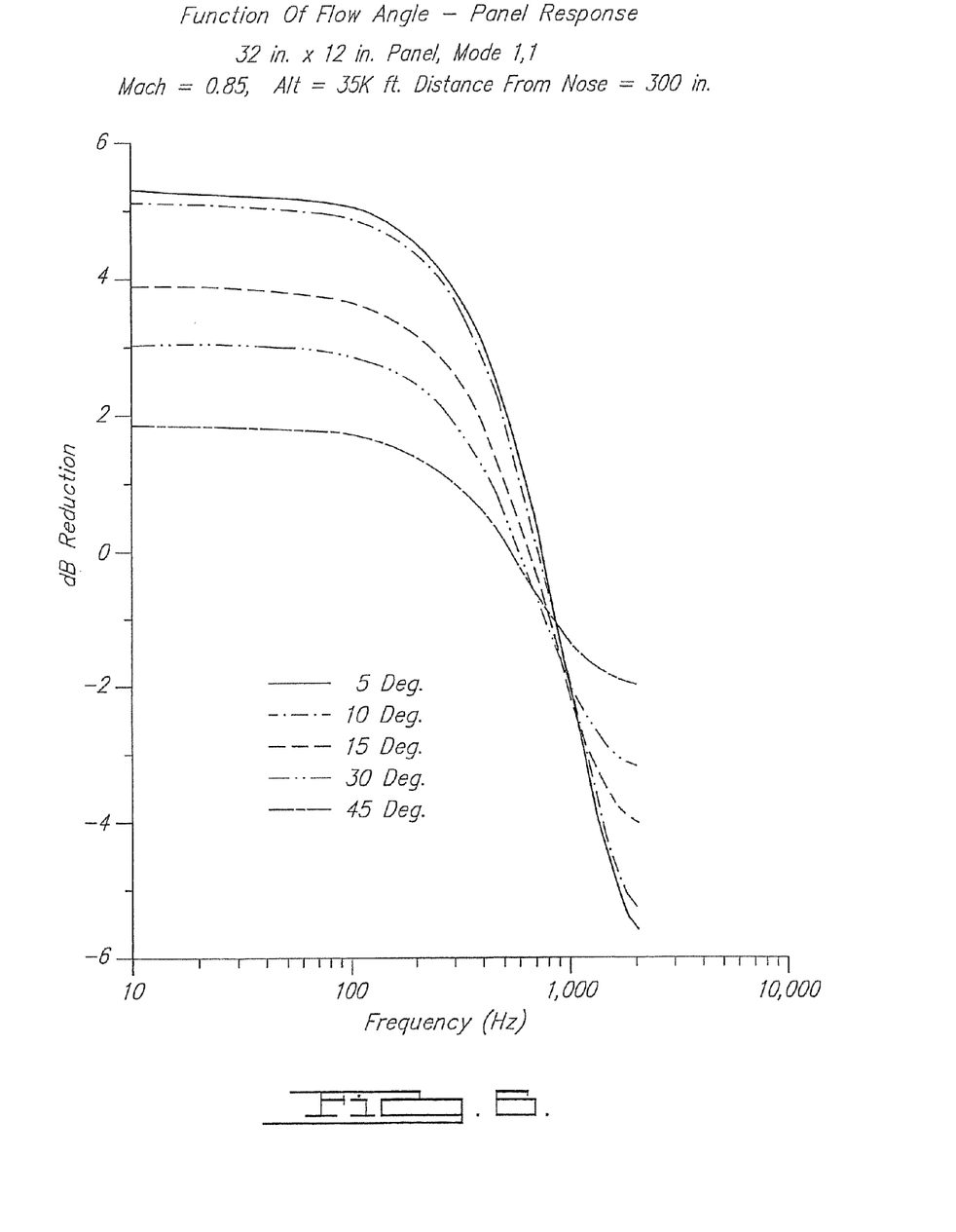
FIG. 6 is a graph illustrating the panel response as a function of flow angle and the decibel level reduction achieved by the panel response.

FIG. 6 shows the $\Delta dB$ reduction of the panel response for the various flow angles. The reduction in panel response associated with a given mode is simply the ratio of the joint acceptance with flow angle $0°$ to the joint acceptance with flow angle $\alpha$.

$$\Delta dB = 10\log \frac{j_{11}^2(\omega)_o}{j_{11}^2(\omega)_\alpha}$$

Although the example is for a particular panel size and aircraft flight condition, the invention is applicable to any structure having a boundary layer flow.

The reduction in panel response (or lack thereof) is a function of the natural frequency of the panel. For a panel with a very low natural frequency there would be a reduction in panel response of up to 5 dB for a flow angle of 30°. For a panel mode natural frequency greater than 800 Hz there would actually be a slight increase in the panel response due to flow angle. Internal pressurization of an aircraft fuselage at altitude is expected to produce a panel mode natural frequency of approximately 400 Hz for the skin panels described. At 400 Hz there would be a 3 dB reduction associated with a 30° flow angle (i.e., a fundamental panel mode shape oriented at 30° relative to the major streamline of the turbulent boundary layer flow). It is worthwhile noting that even a small flow angle of 5° will lead to a 1 dB reduction at 400 Hz.

Figure 7:
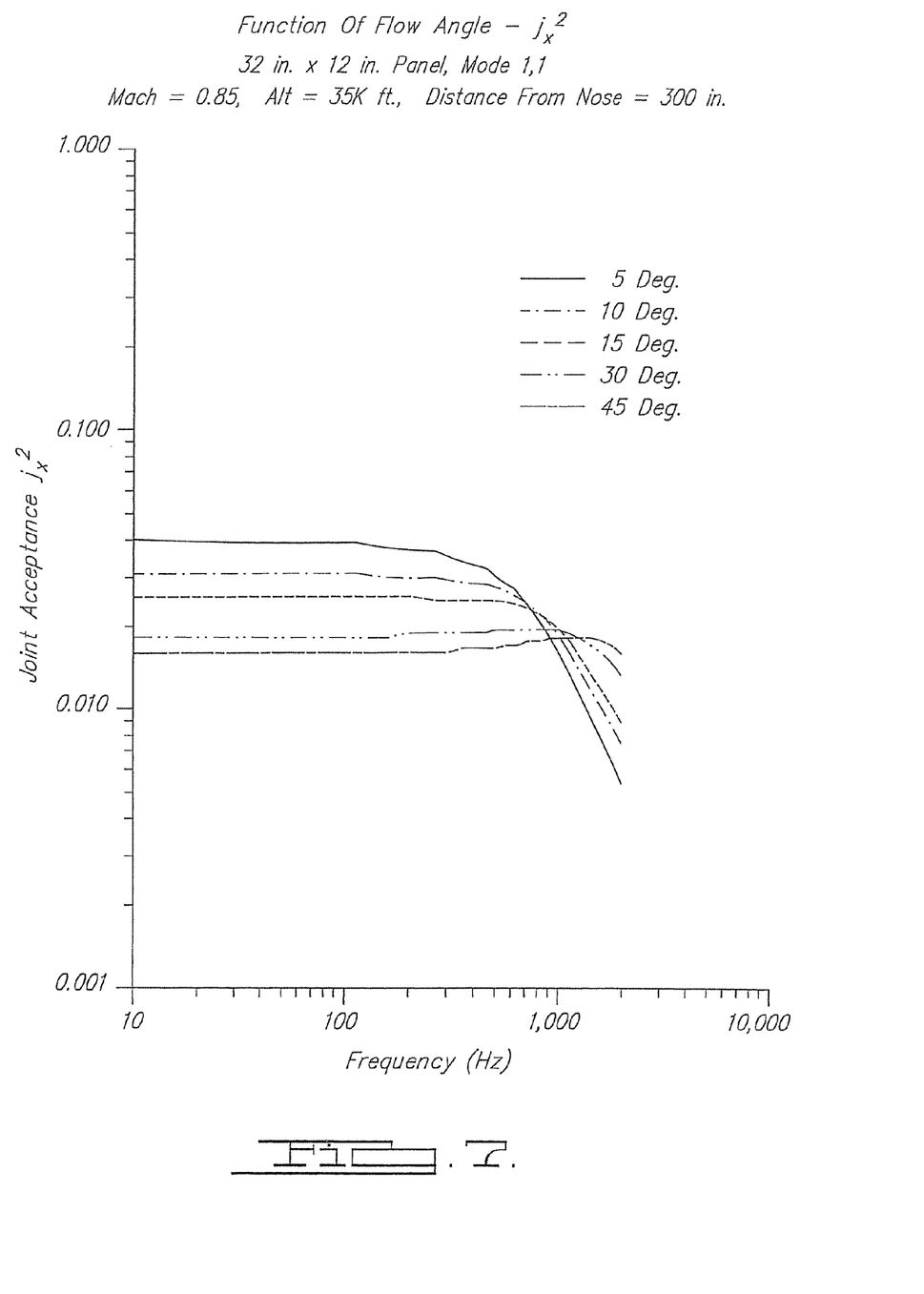
FIG. 7 is a graph of the longitudinal component of the joint acceptance as a function of the mobile frequency.

The individual components $j_x^2$ and $j_y^2$ of the joint acceptance function are shown in FIG. 7 and FIG. 8 for the various flow angles. Whereas the longitudinal component $j_x^2$ quickly decays as a function of flow angle, the lateral component $j_y^2$ is fairly insensitive and increases slightly with higher flow angles. This is attributed to the rapid decay in the span-wise direction, as compared to the decay in the stream-wise direction, of the turbulent boundary layer fluctuating pressure correlating characteristics.

Figure 9:
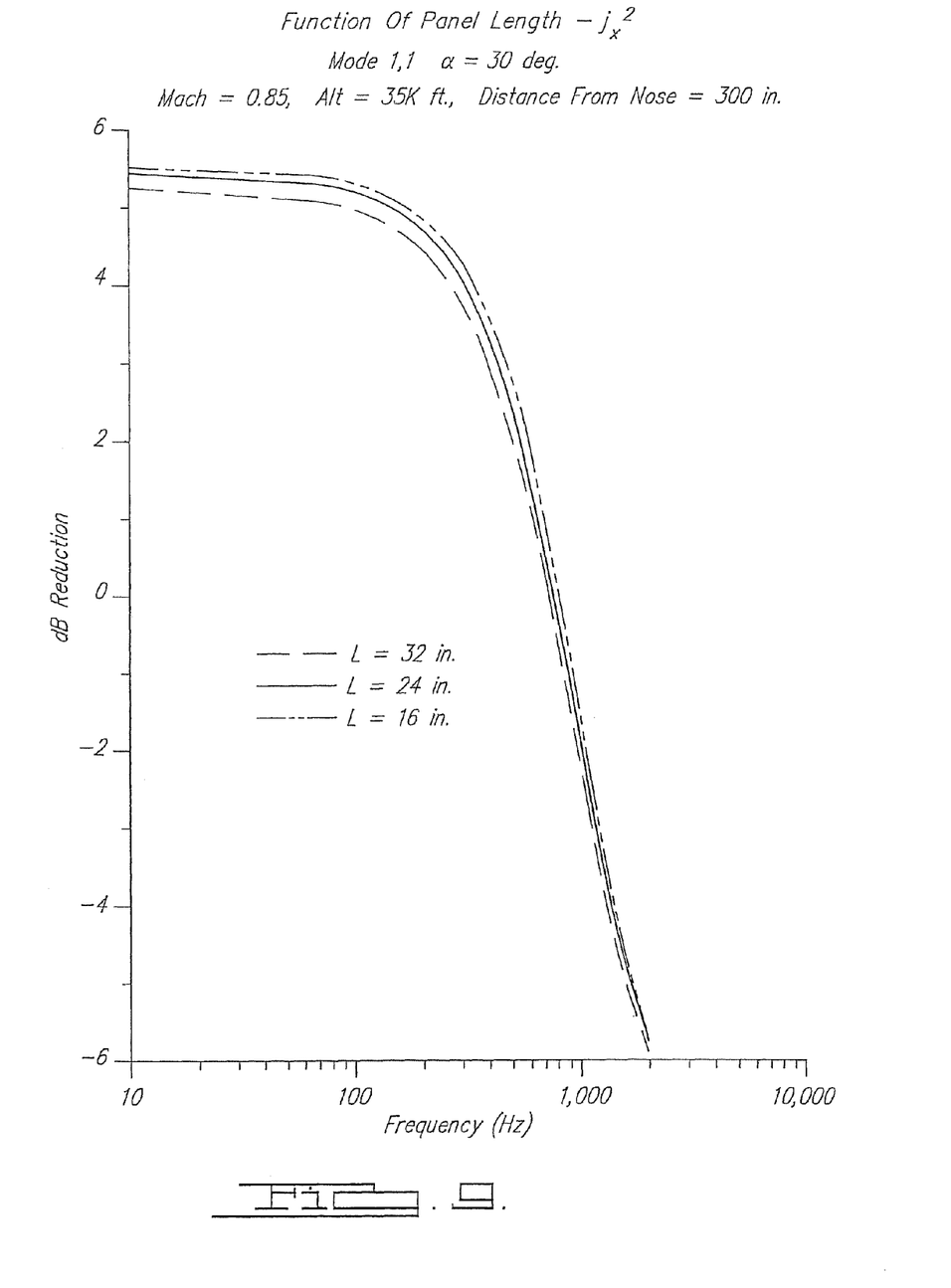
FIG. 9 is a graph of the dB reduction relative to the frequency exciting the fundamental panel vibration mode.

Since it is the longitudinal component of the panel joint acceptance that dominates the panel vibration reduction, the sensitivity to panel length was also investigated (FIG. 9). For a flow angle of 30° only slight differences are observed in the longitudinal component $j_x^2$ of the joint acceptance as the panel length is varied. Thus, changes in panel length are likely to have an insignificant effect on the previously calculated ΔdB reduction associated with flow angle.

The present invention thus enables noise and vibration to be reduced within a cabin or like structure of a fuselage of a mobile platform experiencing a turbulent boundary layer flow over the outer skin panel of the fuselage. Forming the support elements of the fuselage in a manner that provides a fundamental panel vibration mode shape that is angled non-parallel to the direction of the turbulent boundary layer flow results in a noise reduction of at least about 1-5 dB at natural panel frequencies typically produced by the skin panel. For panel vibration mode frequencies less than about 500 Hz, a 3-5 dB reduction in panel response is achieved for the larger angles. The direction of the major streamline of the turbulent boundary layer flow could also influence noise and vibration on higher order modes other than the fundamental panel vibration mode. It is expected that higher order modes will be somewhat less sensitive to changes in the direction of the turbulent boundary layer flow, but that nevertheless some further degree of noise level reduction can potentially be achieved. Furthermore, internal pressurization of the cabin, such as that which occurs in a commercial aircraft, would likely have some impact on the fundamental panel vibration modes and this factor may further require tailoring of the precise orientation of the fundamental panel vibration mode relative to the direction of the major streamline of the turbulent boundary layer flow to achieve maximum noise level reduction within the cabin.

Figure 10:
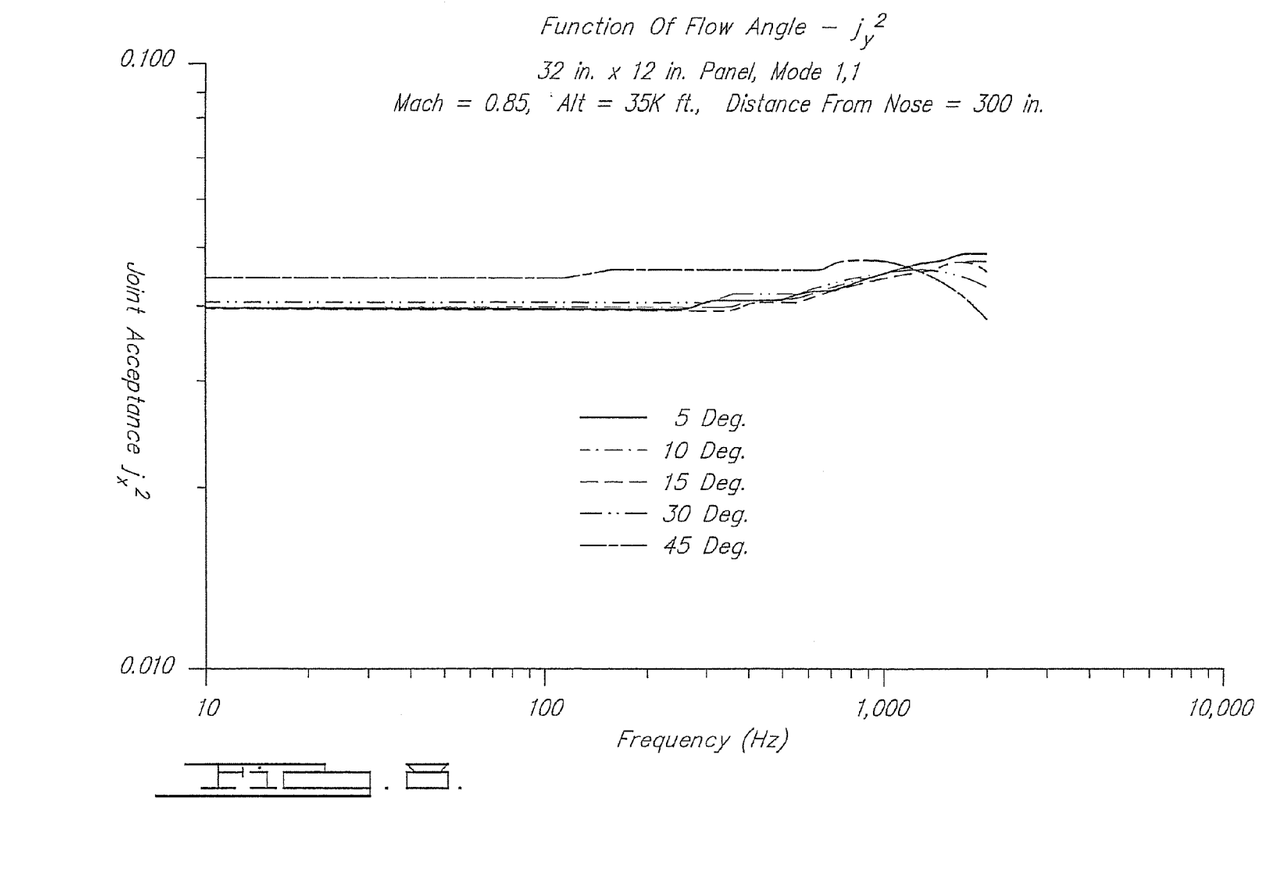
FIG. 10 is an exemplary illustration of the teachings of the present disclosure applied to a window belt region of a commercial jet aircraft.

The various embodiments referred to herein can potentially be used for an entire aircraft fuselage, or could instead be applied to local regions of the fuselage such as window belts or other areas forming relatively high noise regions of a passenger cabin of an aircraft where noise resulting from the orientation of the fundamental panel mode is a principal contributing factor to the overall noise level experienced by occupants of the mobile platform. An example of the teachings of the present application applied to just a window belt region 304 of a fuselage 302 of a commercial jet aircraft 300. The invention could easily be applied to fuselage areas around a flight deck of the mobile platform or other areas of the fuselage. Importantly, the present invention enables a significant degree of noise and vibration reduction to be achieved within an interior area of a commercial aircraft during cruise conditions without the need for additional insulating material to be incorporated within the fuselage, or alternatively may allow a desired degree of noise reduction to be achieved with less insulating material being required, as compared to a mobile platform having a traditionally constructed fuselage. This in turn avoids, or limits, the added cost, weight and complexity of manufacture that would be introduced simply by the use of additional insulating materials, and further helps to prevent a decrease in the fuel economy of the aircraft that would likely be experienced from the added weight of extra insulating materials.

Still further, while the various preferred embodiments have been explained in the context of an aircraft fuselage, it should be appreciated that any high speed land, sea based or airborne mobile platform having a cabin-like interior area, and experiencing a turbulent boundary layer flow over an outer surface of the cabin area, can potentially benefit from the teachings expressed in the present application.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A commercial passenger jet aircraft, comprising:
   a fuselage formed at least in part by a plurality of stringers and frame members that support a skin panel thereon, the fuselage including an enclosed cabin area;
   both of the stringers and the frame members being arranged within a window belt region of the fuselage to be non-parallel to a direction of flow of a turbulent boundary layer over an outer surface of the skin panel that is developed while the jet aircraft is in flight, and said stringers and frame members further being arranged at an angle between about 30-45 degrees inclusive, relative to said direction of flow of said turbulent boundary layer, sufficient to create a fundamental panel vibration mode shape for the skin panel that extends non-parallel to the direction of flow of the turbulent boundary layer; and
   the fundamental panel vibration mode shape operating to reduce noise by at least about 2.0 decibels in said cabin area of the jet aircraft when the jet aircraft is traveling at speeds in excess of about Mach 0.6.

2. The jet aircraft of claim 1, wherein the stringers comprise blade stringers.

3. The jet aircraft of claim 1, wherein the stringers comprise I-beam stringers.

4. A commercial passenger jet aircraft able to cruise at a speed in excess-of about Mach 0.6, the aircraft, comprising:
   a fuselage formed at least in part by a plurality of stringers and frame members that support a skin panel thereon, the stringers, frame members and skin panel helping to define an enclosed, interior cabin area of the aircraft;
   within a window belt region of the fuselage, the stringers and the frame members being arranged non-parallel to a direction of flow of a turbulent boundary layer, and at an angle between about 35 degrees to 40 degrees relative to said direction of flow of said turbulent boundary layer over an outer surface of the skin panel while the jet aircraft is in flight, sufficient to create a fundamental panel vibration mode shape for the skin panel that extends non-parallel to the direction of flow of the turbulent boundary layer; and
   the fundamental panel vibration mode shape operating to help reduce a noise level within said cabin area of said aircraft, by at least about two decibels, when said aircraft is traveling at or above a speed of about Mach 0.6.

5. A commercial passenger jet aircraft able to cruise at a speed of about Mach 0.6, the aircraft, comprising:
   a fuselage formed at least in part by a plurality of stringers and frame members that support a skin panel thereon, the stringers, frame members and skin panel helping to define an enclosed, interior cabin area of the aircraft;
   within only a window belt region of the fuselage, the stringers and the frame members being arranged non-parallel to a direction of flow of a turbulent boundary layer, and at an angle between about 35 degrees to 40 degrees relative to said direction of flow of said turbulent boundary layer, over an outer surface of the skin panel while the jet aircraft is in flight, sufficient to create a fundamental panel vibration mode shape for the skin panel that extends non-parallel to the direction of flow of the turbulent boundary layer; and the fundamental panel vibration mode shape operating to help reduce a noise level within said cabin area of said aircraft, by at least about two decibels when said skin panel has a fundamental panel vibration mode natural frequency of less than about 500Hz, and when said aircraft is traveling at or above a speed of at least about Mach 0.6.

* * * * *